Feb. 19, 1952  C. L. MERSHON  2,586,368
REGULATING SYSTEM
Filed Nov. 4, 1950
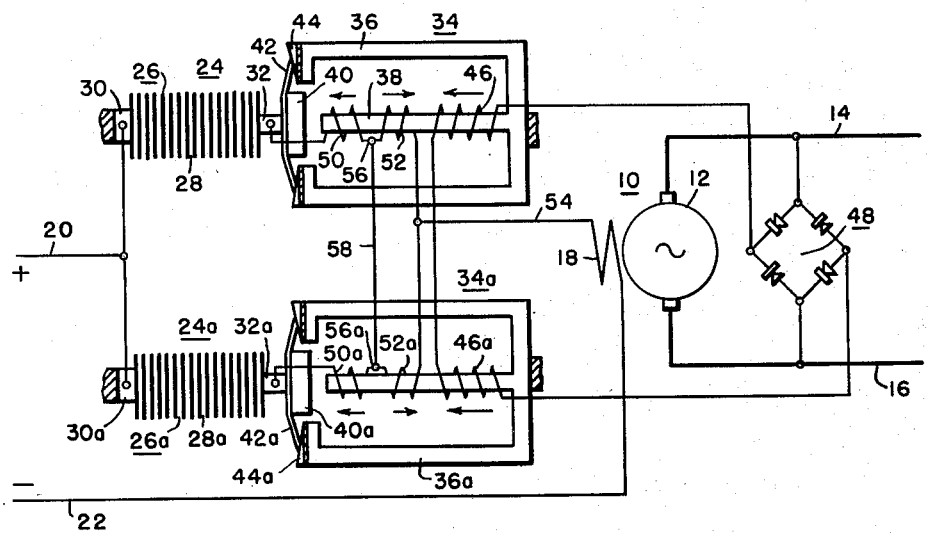
WITNESSES:
INVENTOR
Clarence L. Mershon.
BY
ATTORNEY Patented Feb. 19, 1952

2,586,368

UNITED STATES PATENT OFFICE 2,586,368

REGULATING SYSTEM

Clarence L. Mershon, Lima, Ohio, assignor to Westinghouse Electric Corporation, East Pittsburgh, Pa., a corporation of Pennsylvania Application November 4, 1950, Serial No. 194,135

4 Claims. (Cl. 322—82)

This invention relates to regulating systems.

In aircraft applications, it is found that the field power requirements on certain of the generators are so great that it is necessary to use two or more carbonpile voltage regulators with their stacks of carbon discs connected in parallel circuit relation to control the field power of the generator. In such applications, it has been quite difficult to effect a division of power between the regulators with the result that instability of the regulators is obtained.

An object of this invention is to provide, in a regulating system which utilizes a plurality of pile regulators connected in parallel for controlling the field power of a generator, means for effecting an equalized division of the load between the regulators.

Another object of the invention is to provide a regulating system and a generator having a plurality of pile regulators connected in parallel for regulating the field excitation of the generator, each of the regulators being provided with a main control winding and a pair of auxiliary control windings, one of the auxilary control windings of each regulator being so interconnected with the corresponding winding of the other regulators that there will be an equalized division of the field current therebetween to effect simultaneous adjustment of the regulators to maintain an equalized division of power therebetween.

Other objects of this invention will become apparent from the following description when taken in conjunction with the accompanying drawing, the single figure of which is a schematic diagram of apparatus and circuits embodying the teachings of this invention.

Referring to the drawing, this invention is illustrated by reference to a generator 10, the output of which it is desired to control. In this instance, the generator 10 comprises the armature windings 12 connected by conductors 14 and 16 to supply a load (not shown) and a field winding 18 connected by conductors 20 and 22 to a source of supply represented by the positive and negative symbols.

In order to control the field excitation of the generator 10, a pair of pile regulators 24 and 24a are disposed to be operated in accordance with variations in the load supplied by the conductors 14 and 16. The pile regulators 24 and 24a are identical as to structure and as illustrated represent the type of regulator disclosed and claimed in Patent No. 2,268,718 issued January 6, 1942, to F. Newton. Since the pile regulators are identical as to structure, only one of the regulators will be described in detail, the same numerals being employed for identifying identical components of the regulators 24 and 24a, with the exception that the numeral identifying the components of regulator 24a will have the suffix "a" affixed thereto.

As illustrated, the pile regulator 24 comprises a stack 26 of discs 28 of resistance material, for example carbon, disposed between a fixed terminal pressure plate 30 and a movable terminal pressure plate 32. An electromagnet 34 is disposed to control the pressure applied through the movable pressure plate 32 to the stack 26. In this instance, the electromagnet 34 comprises magnetic structure 36 having a central pole 38 for carrying windings, as will be described hereinafter, and an armature member 40 disposed to be actuated to control the pressure on the stack 26. A spring member 42 is actuated with the armature member 40 and bridges the pole pieces of the magnetic structure 36 to seat against a beveled surface of an abutment member 44 disposed on the end of the magnetic structure 36. In operation, the ends of the spring member 42 wrap upon the beveled surface of the abutment 44 to vary the force of the spring, depending upon the direction of movement of the armature member 40.

In order to control the electromagnetic pull on the armature member 40 and thus vary the pressure and resistance of the stack 26, a main control winding 46 is disposed on the central pole piece 38 disposed to be energized in accordance with fluctuations in the load supplied by the conductors 14 and 16. Thus the main control winding 46 is connected across the output terminals of a full-wave rectifier 48, the input terminals of which are connected to the conductors 14 and 16.

As illustrated, the main control winding 46 of the pile regulator 24 is connected in series circuit relation with the main control winding 46a of the pile regulator 24a so that both of the main control windings are simultaneously energized in accordance with the fluctuations and the load supplied by the conductors 14 and 16. Although the main control windings 46 and 46a are connected in series circuit relation, they are so disposed on their central pole pieces 38 and 38a, respectively, that they develop a flux in the direction indicated by the arrows associated with the windings 46 and 46a.

In addition to the main control winding 46, the pile regulator 24 is also provided with a pair of auxiliary control windings 50 and 52 disposed on the central pole piece 38 and connected in series circuit relation with one another and with the stack 26 so that field current flowing through the stack 26 to the field winding 18 will normally flow through the windings 50 and 52. The auxiliary control windings 50a and 52a of the pile regulator 24a are similarly connected in series circuit relation with their associated stack 26a and with the field winding 18. Thus, as illustrated, the stack 26, auxiliary control winding 50 and auxiliary control winding 52 are connected in series circuit relation with one another but are connected in parallel circuit relation with the series circuit connected stack 26a, auxiliary control winding 50a and auxiliary control winding 52a of the pile regulator 24a, the parallel connected regulators being connected at the fixed terminal pressure plates 30 and 30a to the supply conductor 20 and from one end of the auxiliary control windings 52 and 52a by conductor 54 to a terminal of the field winding 18 of the generator.

While the auxiliary control windings 50 and 52 are connected in series circuit relation with one another, nevertheless they are so disposed on the central pole piece 38 that they are in magnetic opposition to one another and develop fluxes indicated by the arrows associated with each of the windings. Thus it is seen that the winding 52 develops a flux which opposes the flux of the main control winding 46, whereas the auxiliary control winding 50 develops a flux which aids the action of the main control winding 46. A similar flux condition exists for the auxiliary control winding 50a and 52a of the pile regulator 24a, the direction of the fluxes being indicated by arrows associated with the auxiliary control windings.

In order to provide for an equalized distribution of the load through the stacks 26 and 26a of the regulators 24 and 24a, respectively, intermediate points 56 and 56a between the series connected auxiliary control windings 50—52 and 50a—52a, respectively, are connected as by means of a conductor 58. Thus if the flow of current through one of the stacks and consequently the auxiliary control winding 50 or 50a, as the case may be, is greater than the flow of current in the other stack and its associated auxiliary control winding 50 or 50a, the current will divide between the auxiliary control windings 52 and 52a so as to tend to effect an equalized division between the field current flow therebetween. The effect of such a division will be more clearly understood from the description of the operation of the system as given hereinafter.

In operation, assuming that the regulators 24 and 24a have been so adjusted as to have an equalized power division therebetween for maintaining a given field excitation of the generator 10 for supplying a given load, the regulators will tend to function to tend to maintain such an equalized division of power. If for any reason the load supplied by the conductors 14 and 16 should change so that the current flowing through the main control windings 46 and 46a changes, as for example, decreases, then the magnetic pull on the associated armature members 40 and 40a, respectively, decreases and the springs 42 and 42a, respectively, function to increase the pressure on the stacks 26 and 26a, respectively, to effect a decrease in the resistance thereof, whereby the current flowing to the field winding 18 increases to effect an increase in the excitation of the generator 10.

As the current flow through the stacks 26 and 26a thus increases, the current flow through the auxiliary control windings 50—52 and 50a—52a, respectively, proportionally increases. If the current flow through the stacks 26 and 26a is equal, then the current flow through the auxiliary control windings 50—52 and 50a—50a, respectively, are equal and since the auxiliary control windings associated with each of the stacks magnetically opposes one another, the effect of the series-connected auxiliary control windings thus associated with the stacks is nil insofar as controlling the magnetic pull of the armature members. However, if the current flow through the stack 26 should be larger than the current flow through the stack 26a, then because of the interconnection 58 between the intermediate points 56 and 56a, a part of the current which would normally flow in the auxiliary control winding 52 will divide and flow through the conductor 58 and the auxiliary control winding 52a whereby an unbalanced condition exists between the auxiliary control windings 50 and 52 and also between the auxiliary control windings 50a and 52a.

Under such circumstances, the auxiliary control winding 50 develops a larger flux than the auxiliary control winding 52 with the result that the differential therebetween aids the main control winding 46 associated therewith to effect a release of the pressure on the stack 26 to increase the resistance thereof and thereby decrease the current flowing therethrough. At the same time, since a part of the current from the stack 26 flows through the conductor 58 and the auxiliary control winding 52a, the effect of auxiliary control winding 52a predominates over the effect of the auxiliary control winding 50a whereby the differential thereof opposes the action of the main control winding 46a to in effect decrease the magnetic pull on the armature member 40a and increases the pressure on the stack 26a to thereby decrease the resistance of the stack and effect an increase in the flow of current through the stack 26a and the auxiliary control winding associated therewith.

The unbalance between the auxiliary control windings 50—52 and 50a—52a of the regulators 24 and 24a, respectively, will exist as long as the flow of current through the stacks 26 and 26a, respectively, is unbalanced. However, since the current is divided between the auxiliary control windings 52 and 52a, as soon as an unbalanced condition exists between the current flow through the stacks 26 and 26a, it is seen that the auxiliary control windings 50—52 and 50a—52a cooperate with their associated main control windings 46 and 46a, respectively, to quickly and simultaneously initiate and effect changes in the pressure applied to the stacks 26 and 26a, respectively, to effect an equalized division of the current flowing therethrough to the field winding 18. The equalizing effect of the auxiliary windings is obtained for any and all settings of the regulators 24 and 24a and for any and all adjustments thereof in response to variations in the load to maintain and regulate the operation of the generator 10.

The regulating system of this invention embodies a simple load equalizer between the regulators and has a distinct advantage in that only two auxiliary control windings are required for each of the regulators thereby greatly simplifying the structure of the regulator. A simple, fast and direct action is thus obtained for any variation in the power division between the regulators.

the action being substantially instantaneous with any variation from an equalized division of current flow through the stacks of regulators to provide a very stable operation thereof.

I claim as my invention:

1. In a regulating system for controlling an electrical quantity supplied by a generator having a field winding, the combination comprising, a plurality of pile regulators, each of the piles having a stack of discs of resistance material, a main control winding for each of the pile regulators, the main control windings being connected in series circuit relation with one another and disposed to be energized in accordance with the electrical quantity to be controlled, a pair of auxiliary control windings for each of the pile regulators, the windings of each pair of auxiliary control windings being connected in series circuit relation with one another and the stack associated therewith but disposed in magnetically opposed relation, each of the stacks and associated series connected auxiliary control windings being connected in parallel circuit relation with one another and in series circuit relation with the field winding to divide the field exciting current therebetween, one of the magnetically opposed auxiliary control windings of each pair being disposed to oppose the action of the main control winding associated therewith, and means interconnecting each of said one of the auxiliary control windings to effect a substantially equalized division of the field exciting current therein.

2. In a regulating system for controlling an electrical quantity supplied by a generator having a field winding, the combination comprising, a pair of pile regulators, each of the piles having a stack of discs of resistance material, a main control winding for each of the pile regulators, the main control windings being connected in series circuit relation with one another and disposed to be energized in accordance with the electrical quantity to be controlled, a pair of auxiliary control windings for each of the pile regulators, the windings of each pair of auxiliary control windings being connected in series circuit relation with one another and the stack associated therewith, the stacks and associated series connected auxiliary control windings being connected in parallel circuit relation with one another and in series circuit relation with the field winding to divide the field exciting current therebetween, one of each pair of series connected auxiliary windings being connected to oppose the action of the main control winding associated therewith, the other of each pair of series connected auxiliary windings being connected to aid the action of the main control winding associated therewith, and connecting means disposed to interconnect the series connected windings at intermediate points therebetween.

3. In a regulating system for controlling an electrical quantity supplied by a generator having a field winding, the combination comprising, a plurality of pile regulators, each of the piles having a stack of discs of resistance material, a main control winding for each of the pile regulators, the main control windings being connected in series circuit relation with one another and disposed to be energized in accordance with the electrical quantity to be controlled, a pair of auxiliary control windings for each of the pile regulators, the windings of each pair of auxiliary control windings being connected in series circuit relation with one another and the stack associated therewith but disposed in magnetically opposed relation, each of the stacks and associated series connected auxiliary control windings being connected in parallel circuit relation with one another and in series circuit relation with the field winding to divide the field exciting current therebetween, one of the magnetically opposed auxiliary control windings of each pair being disposed to oppose the action of the main control winding associated therewith, means interconnecting each of said one of the auxiliary control windings to effect a substantially equalized division of the field exciting current therein, and connecting means disposed to interconnect the series-connected windings at intermediate points therebetween, said one of the magnetically opposed auxiliary windings of each pair being connected between said interconnected intermediate point and the field winding whereby a substantially equalized division of the field exciting current will be obtained between the different said ones of the auxiliary windings of the regulators.

4. In a regulating system for controlling an electrical quantity supplied by a generator having a field winding, the combination comprising, a pair of pile regulators, each of the piles having a stack of discs of resistance material, a main control winding for each of the pile regulators, the main control windings being connected in series circuit relation with one another and disposed to be energized in accordance with the electrical quantity to be controlled, a pair of auxiliary control windings for each of the pile regulators, the windings of each pair of auxiliary control windings being connected in series circuit relation with one another and the stack associated therewith, the stacks and associated series connected auxiliary control windings being connected in parallel circuit relation with one another and in series circuit relation with the field winding to divide the field exciting current therebetween, one of each pair of series connected auxiliary windings being connected to oppose the action of the main control winding associated therewith, the other of each pair of series connected auxiliary windings being connected to aid the action of the main control winding associated therewith, and connecting means disposed to interconnect the series connected windings at intermediate points therebetween, said one of each pair of series connected auxiliary windings being connected between said interconnected intermediate points and the field winding whereby field exciting current flowing through one of the stacks will divide and flow through both of said one of each pair of series connected auxiliary windings if the current flow through said one of the stacks is of larger value than the current flow through the other of the stacks, the series connected auxiliary control windings and the main control winding of each of the regulators thereby cooperating to maintain a substantially evenly divided flow of current through the parallel connected stacks of resistance material.

CLARENCE L. MERSHON.

No references cited.